April 6, 1965  J. W. STEELE  3,177,008
TRAILER HITCH

Filed April 24, 1964  2 Sheets-Sheet 1

INVENTOR.
JACK W. STEELE
BY M. Ralph Shaffer
HIS ATTORNEY

INVENTOR.
JACK W. STEELE
BY M. Ralph Shaffer
HIS ATTORNEY

United States Patent Office

3,177,008
Patented Apr. 6, 1965

3,177,008
TRAILER HITCH
Jack W. Steele, 6201 Long View Drive, Murray, Utah
Filed Apr. 24, 1964, Ser. No. 365,231
5 Claims. (Cl. 280—502)

This application is a continuation-in-part of the inventor's previously filed application entitled "Trailer Hitch," Serial No. 353,919, filed March 23, 1964, and since abandoned.

This invention relates to trailer hitches and, more particularly, to a new and improved frame hitch of the reversible nature which is uniquely designed for attachment to bumpers which are conventional for certain types of small trucks such as pickup trucks.

Accordingly, a principal object of the present invention is to provide a new and improved, specialized trailer hitch for pickup trucks and other vehicles incorporating parallel horizontal bumper bars, one disposed above the other.

A further object of the invention is to provide a reversible design for trailer hitches wherein the tongue may be raised or lowered as to its operating end, relative to elevation above ground.

A further object of the invention is to provide a new and improved bumper hitch wherein the attachments thereof such as the ball and bumper attachments may be reversed, this for accommodating reverse of the hitch to obtain changes in elevation above ground.

A further object of the invention is to provide a unique type of attachment for pickup truck type bumpers wherein horizontal movement of the hitch is restricted and loading by the hitch of the bumper is distributed throughout the bumper structure.

A further object of the invention is to provide means in a hitch construction for bumper connection such that loading is distributed throughout the bumper construction and not imposed on a small portion or independent part thereof.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

Figure 1:
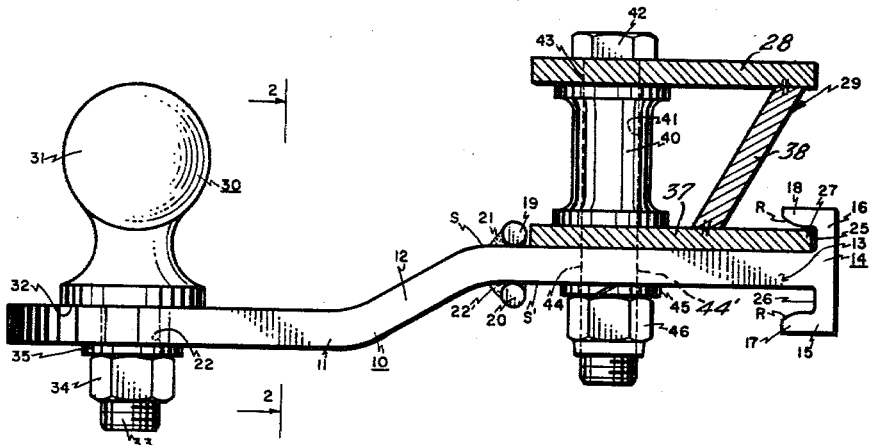
FIGURE 1 is a vertical section, taken along the line 1—1 in FIGURE 2 of the hitch in one selected position, this when installed to the bumper of a suitable vehicle.
Figure 3:
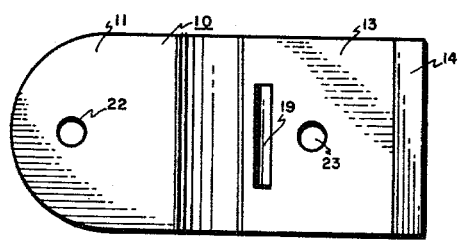
FIGURE 3 is a top plan of the hitch tongue member, this shown in reduced scale.

In FIGURE 1 tongue member 10 includes outer tongue portion 11, medial tongue portion 12, and inner tongue portion 13, all contiguously and integrally related as shown. Inner tongue portion 13 is provided with a bumper mounting portion 14 having lipped flanges 15 and 16 each of which is provided with a respective lip portion 17 and 18. The bumper mounting portion 14 may, of course, simply comprise a channel which is welded to strap material or casting forming the tongue. Preferably, the innermost corners of lip portions 17 and 18 are relieved at R to provide for correct insertion of the bumper bar 28 as hereinafter explained. Disposed upon opposite surfaces S and S' of tongue member 10, at medial or intermediate tongue portion 12, are stop retainers 19 and 20 which may be secured in place as by welds 21 and 22', as shown. The stop retainers may of course be movable or comprise clamps; however, in a preferred form of the invention they are simply small diameter rod segments approximately one-quarter inch in diameter, for example, which are welded in place. See in this connection FIGURES 3 and 4. Apertures 22 and 23 are provided in tongue member 10 and comprise a ball hitch mounting aperture and a bumper hitch mounting aperture, respectively. Now it will be noted relative to the construction illustrated in FIGURES 1, 3, and 4 that the tongue member is reversible, see FIGURE 5. Hence, the bumper bar receiving recesses at 25 and 26, alternatively, can engage the rear edge extremity 27 of bumper bar 28 of the over-all bumper 29, for varying trailer height conditions. In the event of reversal, of course, the remaining attachments such as the ball hitch and the bumper bar attachment means, hereinafter to be described, will also be reversed, i.e. disposed on the opposite side of the tongue member. At this point it is important to note that the tongue member 10 takes a general S configuration, this so that the ball hitch may be disposed in either of two conditions, see FIGURES 1 and 5.

Figure 4:
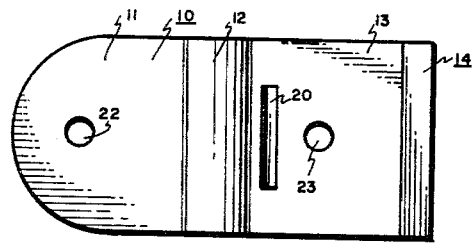
FIGURE 4 is a plan of the bottom surface of the tongue member shown in FIGURE 3.

At this juncture there is to mention the conventional ball hitch which includes ball member 31 having lower bearing surface 32 and threaded shank 33. Fiber locknut 34 and lock washer 35 are provided as is conventional. It will be understood that separate bolt means may be included for attaching the ball to the tongue member if desired. Ball hitch mounting aperture 22 receives threaded shank 33 and is illustrated in FIGURE 4 and in dotted lines in FIGURE 1.

Figure 2:
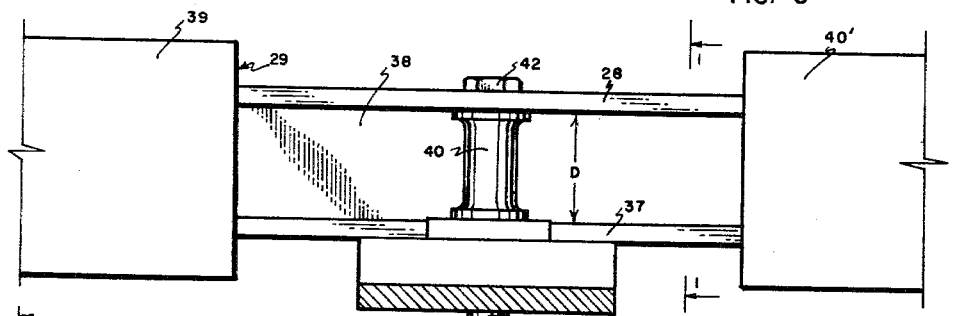
FIGURE 2 is a vertical section taken along the line 2—2 in FIGURE 1, illustrating in rear view the type of bumper for which hitch connection is intended and the attachment of the hitch to the bumper.

Now the construction is primarily intended for bumpers of a general configuration as illustrated in FIGURE 2. The bumper 29 in its general form will include transverse horizontal bumper bars 28 and 37, diagonal flange plate 38, and bumper face plates 39 and 40'. In the general construction all of this is welded together and to the frame of the vehicle to form a very sturdy bumper construction. This or similar structures are found on many makes of pickup trucks, for example, suitable for carrying transportable campers and hauling trailers or both.

The bumper bars 28 and 37 of the bumper 29 will, in general, be spaced an unique distance apart. Hence, support spacer 40 may comprise a spool, for example, having interior bore 41 as illustrated in FIGURE 1. The interior bore 41 of support spacer 40 receives attachment bolt 42. This bolt proceeds through aperture 43 of bumper bar 28, aperture 44 of inner tongue portion 13, and aperture 44' of bumper bar 37, to be engaged by lock washer 45 and lock nut 46. Now the support spacer 40 serves two very useful purposes. The first of course is to add marked support to the two bumper bars 28 and 37 so that their spacing and orientation may be preserved for moderate to quite heavy loads. The second purpose is to receive the conventional chain for looping therearound, which chain will generally be attached to the trailer or boat which the vehicle is towing by the hitch. It is to be noted that by virtue of spacer 40 the entire bumper structure is loaded so that bumper bars 28 and 37 both assist in carrying the load.

Figure 5:
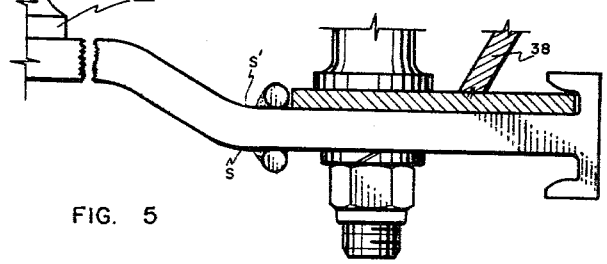
FIGURE 5 is a fragmentary view, similar to FIGURE 1, but is illustrated wherein the outer tongue portion of the hitch is elevated with respect to that shown in FIGURE 1.

In FIGURE 5 it is seen that the tongue is reversed. In such a situation the attachments will also be reversely oriented as indicated in FIGURE 5.

The structure thus described operates as follows. The installation thereof is clearly indicated in FIGURE 1, this relative to the lowermost bumper bar 37 which will be supplied standard bumpers for the vehicle. Stop retainers 19 and 20 and bumper mounting portion 14 assist in restraining appreciable translation movements fore and aft of the hitch when the same is being used to tow a trailer or other vehicle. The downward load carried by the hitch is distributed through the bumper structure by the incorporation of the support spacer 40 and also the bolt, nut and washer attachments 42, 45, and 46.

Where the elevation of the axles of the towed vehicle above ground is greater than may be usual, for example greater than the trailer which is to be towed by the structure in FIGURE 1, then the engagement of the ball and bolt, etc., with the unit may be reversed, as indicated in FIGURE 5, so that ball hitch 30 assumes greater elevation above ground. This is so because the planes of inner and outer tongue portions 13 and 11, whether they be intersecting or parallel as shown, are vertically mutually spaced.

Figure 6:
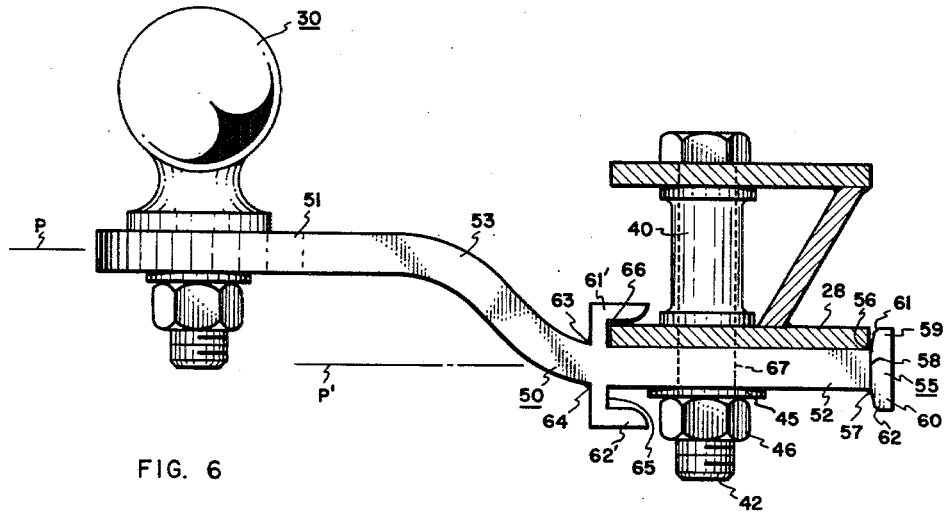
FIGURE 6 is a side elevation of a hitch representing another embodiment of the present invention and is shown in a manner similar to the first embodiment as seen in FIGURE 1.
Figure 7:
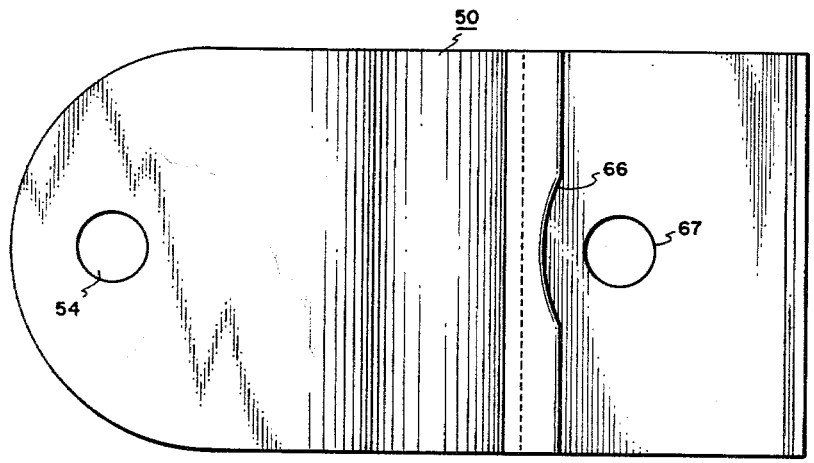
FIGURE 7 is a top plan of the tongue member of the hitch as employed in the second embodiment of the invention.

In FIGURES 6 and 7 tongue member 50 includes outer tongue portion 51, inner tongue portion 52, and intermediate tongue portion 53 integral with and interconnecting the same. A ball hitch mounting aperture 54 is provided, similar to aperture 22 in FIGURE 4, and receives ball hitch 30 for the mounting thereof in a manner as heretofore explained in connection with the embodiment shown in FIGURES 1–5. Likewise, attachments 42, 46, and support spacer 40 are supplied as generally indicated in FIGURE 1. A strap member 55 is welded at 56 and 57 to extremity 58 of tongue member 50 and provides stop retainer flange portions 59 and 60. Edges 61 and 62 of the latter may be chamfered as shown to provide for easy insertion of bumper bar 28. Upper and lower, lipped flanges 61' and 62' preferably take the form of angle irons which are welded at 63 and 64, respectively, to the upper and lower surfaces of inner tongue portion 52. Hence, bumper bar receiving recesses 65 and 66 may thereby be provided. If desired, both of the angle-iron lipped flanges 61 and 62 may be relieved at 66 to accommodate the positioning of support spacer or spool 40. See FIGURE 7. Aperture 67 will of course be supplied to accommodate bolt attachment 42.

As with the embodiment of FIGURES 1–5 as well, it will be seen that the inner and outer tongue portions of tongue member 50 are disposed in vertically spaced, horizontal planes P and P'. This is necessary in order that the hitches may be reversed, i.e. rotated about their respective longitudinal axes 180°, so as to provide two, discrete heights for the disposition of ball hitch 30.

In operation the embodiment shown in FIGURES 6 and 7 will perform substantially the same as that indicated with reference to the embodiment shown in FIGURES 1–6. A reversal of the structure, when compared with FIGURE 1, as to the provision of bumper bar receiving recesses 65 and 66 serves not only to provide for the mounting of the hitch structure to the bumper bar 28, as before, but also enables the angle iron flanges 61–62 to assist in carrying the load applied to ball hitch 30, thereby relieving some of the load applied to support spacer or spool 40 and its attachments. Again, chamfered corners 61 and 62 provide for easy mounting of the hitch onto bumper bar 28.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. For attachment to the rear bumper of a vehicle, said bumper having fixedly disposed, vertically spaced bumper bars; a trailer hitch including, in combination, an invertible tongue member having an outer tongue portion, an inner tongue portion, and an intermediate tongue portion integral with and connecting said outer and inner tongue portions, said outer and inner tongue portions being in vertically spaced planes, a ball hitch releasably secured to said outer tongue portion and constructed for mounting to both sides, alternately, of said outer tongue portion, and means releasably securing said hitch to said bumper at said bumper bars, and wherein said tongue member is provided with a bumper mounting portion integral with said inner tongue portion and having upper and lower lipped flanges delineating respective bumper bar receiving recesses.

2. Structure according to claim 1 wherein said tongue member is provided with upstanding stop retainers disposed on opposite sides thereof, said stop retainers being spaced from said bumper mounting portion by a distance nominally equivalent to the width of said bumper bar which it retains.

3. In combination, a rear bumper of a vehicle having a pair of vertically spaced, laterally extending bumper bars fixedly disposed with respect to each other; and a trailer hitch having a tongue member provided with a bumper mounting portion, said bumper mounting portion defining respective bumper-bar receiving recesses on both sides of said tongue member, the lowermost one of said bumper bars being received by one of said recesses, a vertically oriented support spacer disposed between said bumper bars and engaging the adjacent surfaces thereof, attachment means disposed through said bumper bars, through said support spacer, and through said tongue member for securing said tongue member to said bumper at said bumper bars, and a ball hitch releasably secured to said tongue member on a selected one of the sides of said tongue member, and wherein said tongue member includes outer, intermediate, and inner tongue portions, said outer and inner tongue portions being disposed in vertically spaced planes and wherein said ball hitch is constructed and arranged for mounting on a selected one of both sides of said outer tongue portion.

4. A trailer hitch including, in combination, an invertible tongue member having an outer tongue portion, an inner tongue portion, and an intermediate tongue portion integral with and connecting said outer and inner tongue portions, said outer and inner tongue portions being in vertically spaced planes, a ball hitch secured to said outer tongue portion and means secured to said inner tongue portion for mounting said tongue member to a towing vehicle and, wherein said towing vehicle includes a rear bumper having an accessible, horizontally disposed bumper bar, and wherein said tongue member is provided with upper and lower lipped flanges secured to opposite sides of said inner tongue portion and delineating respective bumper bar receiving recesses a selected one of which engagedly receives said bumper bar, and stop means coacting with said flanges and spaced therefrom and secured to said inner tongue portion for securing said tongue member against horizontal translational movement with respect to said bumper bar.

5. Structure according to claim 4 wherein said flanges are disposed rearwardly of and proximate said bumper bar and face forwardly with respect thereto, and wherein said stop means are disposed forwardly of and proximate said bumper bar.

References Cited by the Examiner
UNITED STATES PATENTS

| 2,142,365 | 1/39 | McKee | 280—502 X |
| 2,516,459 | 7/50 | French et al. | 280—502 |
| 2,654,613 | 10/53 | Blair et al. | 280—490 X |
| 2,818,277 | 12/57 | McElhoe | 280—502 X |

A. HARRY LEVY, *Primary Examiner.*

PHILIP ARNOLD, *Examiner.*